United States Patent [19]
Hartmann et al.

[11] Patent Number: 5,938,165
[45] Date of Patent: Aug. 17, 1999

[54] ARTICLE FOR ATTACHMENT TO A SURFACE

[75] Inventors: Jerome Hartmann, Carlisle; Thomas R. Steinhagen, West Des Moines, both of Iowa

[73] Assignee: Cobbs Manufacturing Company, Des Moines, Iowa

[21] Appl. No.: 08/841,996

[22] Filed: Apr. 22, 1997

[51] Int. Cl.⁶ .................................................. A47F 1/14
[52] U.S. Cl. ........................................ 248/466; 248/470
[58] Field of Search ................................. 248/466, 467, 248/476, 477, 478, 479, 480, 485, 490, 489, 493, 309.1, 690, 692, 229.16, 229.21, 229.22, 229.26, 229.31, 231.81, 470; 211/86, 86.01, 113, 13.1; 24/563, 336, 265 C; D12/191; 296/97.3, 97.7, 97.9

[56] References Cited

U.S. PATENT DOCUMENTS

| | | | |
|---|---|---|---|
| D. 168,707 | 1/1953 | Pavenick | D12/191 |
| D. 265,083 | 6/1982 | Divoky | D12/191 |
| D. 286,036 | 10/1986 | Langensiepen | D12/187 |
| D. 325,554 | 4/1992 | Min-Jenn | D12/191 |
| 2,097,419 | 10/1937 | Schmidt | 359/602 |
| 2,252,716 | 8/1941 | Levy | 296/97.5 |
| 3,030,057 | 4/1962 | Wright | 248/470 |
| 3,140,781 | 7/1964 | Rothgart | 211/13.1 |
| 4,103,860 | 8/1978 | Haas et al. | 248/467 |
| 4,179,155 | 12/1979 | Ortiz | 296/97 |
| 4,273,277 | 6/1981 | Stone | 224/312 |
| 4,391,053 | 7/1983 | Anthony | 40/152 |
| 4,624,499 | 11/1986 | Flowerday | 296/97 H |
| 4,710,856 | 12/1987 | Cheung | 362/74 |
| 4,889,380 | 12/1989 | Pillifant, Jr. | 296/97.6 |
| 4,895,435 | 1/1990 | Shomper | 350/606 |
| 4,909,562 | 3/1990 | Sakuma et al. | 296/97.5 |

*Primary Examiner*—Leslie A. Braun
*Assistant Examiner*—Tan Le
*Attorney, Agent, or Firm*—Dick and Harris

[57] ABSTRACT

An article for attachment to a surface includes a base member and an attachment member for attachment to the surface. The base member includes a top surface, a bottom surface and a transverse axis. The attachment member includes a clip member which is capable of releasable engagement with the surface, and, a retaining member which retains the clip member in releasable securement with the base member in one of two separate alternative orientations relative to the transverse axis of the base member.

18 Claims, 2 Drawing Sheets

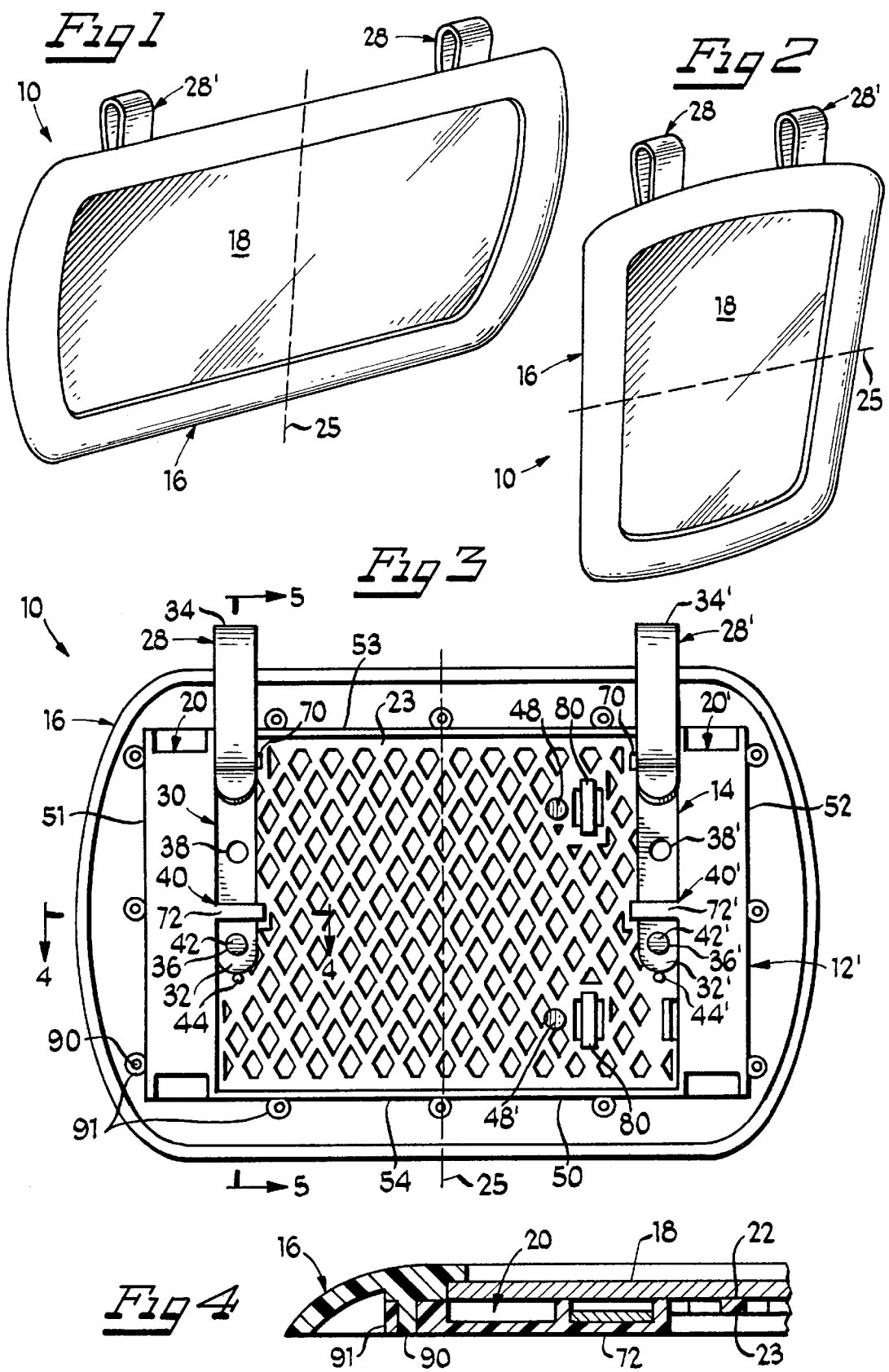

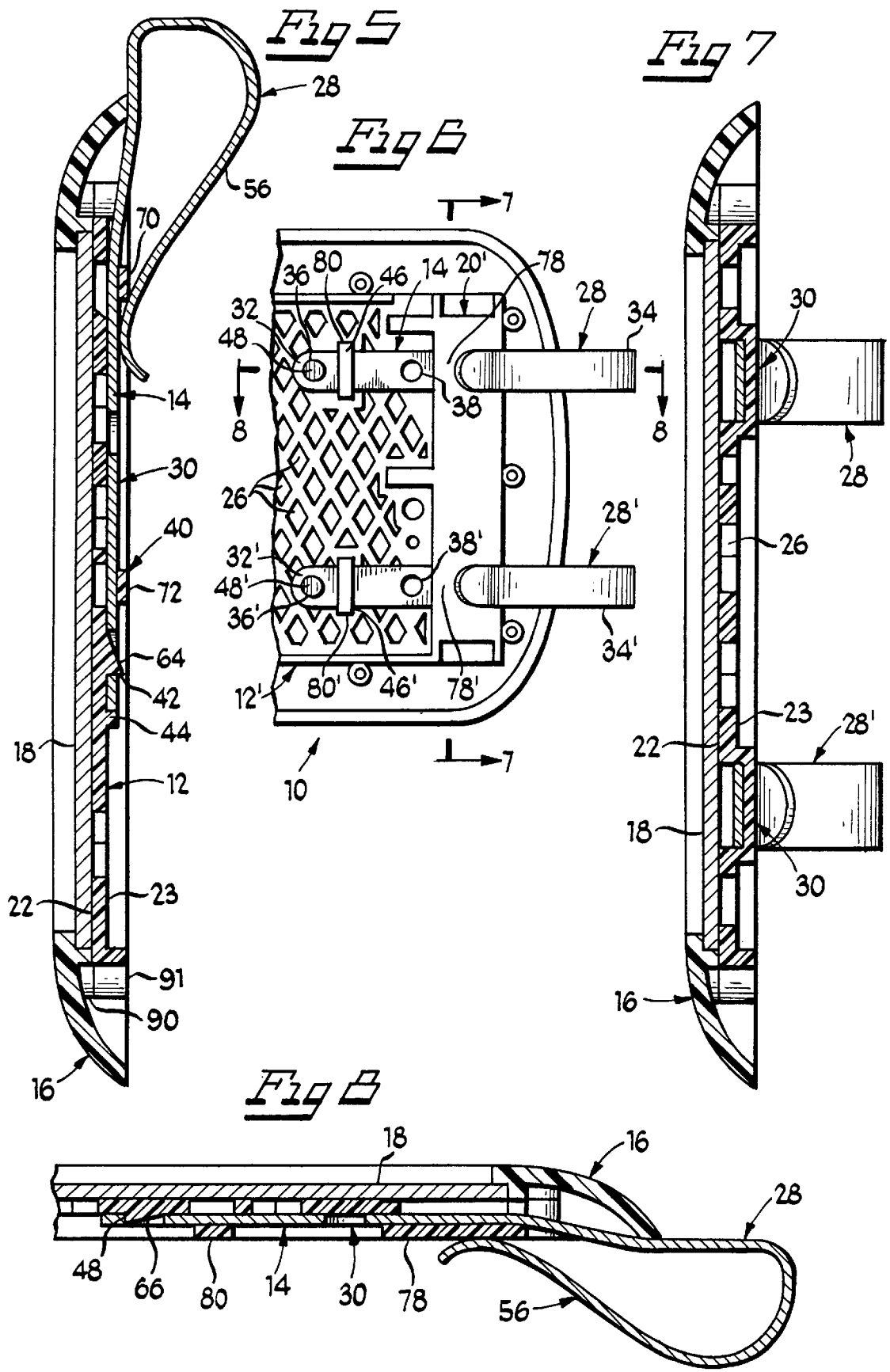

ARTICLE FOR ATTACHMENT TO A SURFACE

BACKGROUND OF THE INVENTION

1. Field of the Invention

The present invention relates to an article for attachment to a surface, and more particularly to an article for attachment to a surface in varying orientations. For instance, the invention is directed to vanity mirrors for attachment to the sunvisor of a vehicle.

2. Background Art

Articles for attachment to a surface, and, in particular those for use in association with vehicle sunvisors have been known in the art. These articles generally fall into two broad classes, the first class comprises articles that are integrally attached with the vehicle sunvisor, and the second comprises articles which are independent of the vehicle sunvisor and attachable by a user.

The first type of article is usually supplied by the car maker with the vehicle when new. Many of these articles are mounted within the fabric overlay on the vehicle sunvisor or sized to fit within a slot in the sunvisor. Other integrated article and sunvisor structures are available; these structures involve the replacement of the entirety of the sunvisor with an "aftermarket" sunvisor having an integrated article therewith. While this type of article/sunvisor may include a multitude of features, it is quite difficult, if not impossible to transfer the article from vehicle to vehicle, as needed. Moreover, even if possible, the movement of such integrated articles from vehicle to vehicle often times involve a complex removal procedure followed by a complex installation procedure.

The second type of article may be attached and/or removed from a vehicle sunvisor (or other surface) with relative ease. While moving the article from vehicle to vehicle is facilitated, the articles are limited bemuse they include only a single "universal" attachment orientation. Inasmuch as different sunvisors are different in shape and size, a single attachment orientation may render the article unsuitable for use in association with all sunvisors. Specifically, while the attachment orientation may be acceptable for attachment of the article to a first vehicle, in a second vehicle, having a differently sized and sped sunvisor, the single "universal" attachment orientation of the article may prohibit attachment of the article. Even if the article is capable of use with both vehicles' sunvisors, the attachment orientation may nevertheless compromise the usefulness of the article to the user.

SUMMARY OF INVENTION

The present invention is directed to an article for attachment to a surface. The article includes a base member having a top surface, a bottom surface and a transverse axis. The article further includes means for attaching the base member to a surface. The attaching means includes at least one releasable clip member which is capable of releasable engagement with the surface, and, means for retaining the clip member in releasable securement with the base member in at least one of two separate alternative orientations relative to the transverse axis of the base member.

In a preferred embodiment, the clip member includes a first end and a second end. The first end of the clip member has a first aperture and a second aperture. In such a preferred embodiment, the retaining means includes a first channel member which is associated with the base member and is capable of receiving the clip member. The first channel member includes a first shank member and is positioned such that upon slidable positioning of the clip member into the first channel member the shank member engages the aperture of the clip member.

The retaining means may further include a second channel member associated with the base member capable of slidably receiving the clip member. The channel member is positioned in a substantially perpendicular position relative to the first channel member. The second channel member includes a second shank positioned in such a way that upon slidable positioning of the clip member into the second channel member, the second shank member engages the aperture of the clip member.

In one preferred embodiment, the first shank member includes a cammed surface to facilitate engagement of the shank member and the first aperture. Additionally, the first channel member may include a limiter member for limiting the slidable movement of at least one clip member. The second of the clip member may also include a curved tip region bent back about the second end so as to be capable of slidable securement of the surface. In such an embodiment, the curved tip is biased against the second end itself.

It is also contemplated that the base member be substantially rectangular and include a first pair of sides which are longer than a second pair of sides. In such an embodiment, the first channel member is oriented parallel to the second pair of sides and the second channel member is oriented parallel to the first pair of sides.

BRIEF DESCRIPTION OF THE DRAWINGS

FIG. 1 of the drawings is a front perspective view of the article showing a first orientation of the attachment means;

FIG. 2 of the drawings is a front perspective view of the article showing the second orientation of the attachment means;

FIG. 3 of the drawings is a back elevational view of the article;

FIG. 4 of the drawings is a partial cross-sectional view of the article, taken generally along lines 4—4 of FIG. 3;

FIG. 5 of the drawings is a cross-sectional view of the article, taken generally along lines 5—5 of FIG. 3;

FIG. 6 of the drawings is a partial rear elevational view of the article;

FIG. 7 of the drawings is a cross-sectional view of the article, taken generally along lines 7—7 of FIG. 6; and FIG. 8 of the drawings is a partial cross-sectional view of the article, taken generally along lines 8—8 of FIG. 6.

DETAILED DESCRIPTION OF THE DRAWINGS

While this invention is susceptible of embodiment in many different forms, there is shown in the drawings and will herein be described in detail, a specific embodiment with the understanding that the present disclosure can be considered as an exemplification of the principles of the invention and is not intended to limit the invention to the embodiment illustrated.

As shown in FIG. 1–3, article 10 includes base member 12, attaching means 14, frame member 16, reflective member 18 and tunnel regions 20, 20'. Base member 12 is shown in FIG. 3, 5, 7 as including top surface 22, bottom surface 23, exterior perimeter 50, openings, such as opening 26, and transverse axis 25. The openings serve to project a lattice like pattern. As shown in FIG. 3, exterior perimeter 50 includes short side edges 51, 52, long side edges 53, 54 and joining members (FIG. 3), such as joining member 91. As will be explained, joining members matingly engage receiver members 90. Additionally, while base member 12 is shown as being substantially rectangular, any other shapes, including circles, triangles, squares and other multi-sided shapes are likewise contemplated. Further, the base member preferably comprises an injection molded plastic material, however different materials, such as metals and wood, among others, and different production processes, such as stampings or extrusions, are likewise contemplated.

Transverse axis 25, as shown in FIGS. 1–3, extends parallel to short side edges 51, 52 (FIG. 3) and bisects long side edges 53, 54 (FIG. 3). Inasmuch as transverse axis 25 comprises a reference line for purposes of determination of the orientation of the attaching means, the position of the transverse axis with respect to any feature of the base member is wholly arbitrary.

Attaching means 14 is shown in FIG. 3, 5–8 as comprising clip members 28, 28' and retaining means 30. Clip member 28 is shown in FIG. 3 and 6 as including first end 32 and second end 34. First end 32 includes two co-linear openings defining aperture 36 and aperture 38. Second end 34 includes curved tip region 56 (FIGS. 5–8) that bends back in a J-shaped configuration to be biased against second end 34. Preferably, the clip member comprises a resilient plastic member, or, a metallic member of suitable strength and ductility so as to be capable of retaining an object within the J-shaped configuration. Clip member 28' is substantially identical to clip member 28 in structure and function. As such, clip member 28' likewise includes first end 32', second end 34' (which includes apertures 36', 38' and curved tip region 56').

Retaining means 30 of attaching means 14 is shown in FIGS. 3, 5–8 as comprising left first channel member 40, right first channel member 40', top second channel member 46, and bottom second channel member 46'. First channel members 40, 40' are shown to be oriented parallel to transverse axis 25, whereas second channel members 46, 46' are shown to be oriented perpendicular to transverse axis 25. First channel members will be described relative to left first channel member 40, and it will be understood that the first channel members 40, 40' are substantially identical in structure and function. Similarly, second channel members 46, 46' will be described relative to the top second channel member 46 with the understanding that the second channel members are substantially identical in structure and function.

Left first channel member 40 includes first guide members 70, 72, first shank member 42 and first limiter member 44. First guide members 70, 72 define the width of the channel member and, correspond, in width, to clip member 28. First shank member 42 is shown in FIG. 5 as positioned laterally about the midpoint of first channel member 40 and downward from guides 70, 72. First shank member 42 includes cammed surface 64 (FIG. 5) which is inclined in an upward direction from long side edge 53. First limiter member 44 is positioned substantially co-linearly with first shank member 42 at a downward distance from the first shank member and which is substantially equal to the distance between aperture 36 and first end 28.

Similarly, as so in FIGS. 6 and 8, second channel member 46 includes second shank member 48, and second guide members 78 and 80. Second shank member 48 is positioned beyond guide member 82 and about its transverse mid-point Second shank member 48 includes cammed surface 66 (FIG. 8) which is inclined upward away from short side edge 52, and positioned parallel to top second channel member. Second guide members 78 and 80 defines the width of second channel member 46, and, substantially corresponds to the width of clip member 28.

Reflective member 18 is shown in FIGS. 1–2 as positioned over base member 12. Reflective member 18 (a mirrored surface) is sized to correspond to base member 12. While the article is shown as comprising a reflective member/mirror, it is likewise contemplated that the article may be used in association with a tape/cd holder, a glasses case, or other structure commonly attached to a outside surface, and particularly, an outside surface of a vehicle.

Frame member 16 is shown in FIG. 1, 2, 3 and 5 as comprising non-uniform exterior band 30 which extends about exterior perimeter 50 of reflective member 18, and receivers, such as receiver 90, which matingly engage with corresponding joining members 91 on the base member to effectively clamp reflective member 18 therebetween. While various shapes and configurations are contemplated, frame member exterior band is curved smoothly and substantially free of sharp edges and creases.

As shown in FIGS. 3 and 4, article 10 further includes tunnel regions 20, 20' which each extend parallel to short sides 51, 52 from long side 53 to long side 54. Tunnel regions 20, 20' are capable of accepting conventional hoop-type strapping members (not shown), in place of, or to supplement attachment means 14.

In operation, a user first decides the particular desired orientation of the article with respect to the outside surface (such as a sunvisor). As shown in FIGS. 3 and 6, the user can select between using the first channel members 40,40' or the second channel member 46, 46' of retaining means 30. As explained, the first channel members 40, 40' are shown to be oriented parallel to transverse axis 25, whereas second channel members are shown to be oriented perpendicular to transverse axis 25. Of course, additional orientations having different relationships with respect to the transverse axis, and, in turn different orientations therewith are likewise contemplated. For example, a first orientation may comprise channel members at a 45° angle with respect to the transverse axis, and second channel may be at an angle of 10° with respect to the transverse axis.

Once the desired orientation is determined, the user positions clip member 28 into retaining means 30. For example, if the user desires to utilize first channel members 40, 40', such as is shown in FIG. 1, then, as shown in FIG. 3, the user first inserts first end 32 of clip ember 28 into first channel member 40. As first end 32 approaches first shank member 42, the cammed surface 64 of first shank member (FIG. 5) guides first end 28 over the shank member. First end 32 of clip member 28 continues over first shank member 42, until aperture 36 is directly over shank member, at which time first shank member 42 extends through aperture 36 to matingly engage same, precluding further movement of clip member 28 along the first channel member 40. At the same time that first shank member 42 engages aperture 36, first end 28 abuts first limiter member 44, thus ensuring against any further movement of first end 32 of clip member 28 along first channel member 40.

In a like manner, a substantially identical clip member 28' is inserted into channel member 40' until second shank member 48' engages aperture 36' and limiter member 44' abuts first end 32' of clip member 28'. While a shank/limiter/aperture retention structure is disclosed, other retention structures, such as velcro or other fasteners are likewise contemplated for use in association with the retention of first end to channel members.

Once the clip members are securely positioned, the second ends 34, 34' may be attached to the outside surface. In the case of a sunvisor, the user slips the visor between the curved region of the second end and the second end itself. Once positioned, the curved region is naturally biased toward, and exerts a clamping force upon the sunvisor to preclude inadvertent detachment thereof. Of course, second end 34 of clip member 28 may include other retention structures having any of a multitude of conventional fasteners for facilitating attachment of the article to an outside surface.

If the user wishes to move the article to another surface, for example, to a different vehicle, depending on the type of surface to which he win attach the article, the orientation of the retaining means may have to be altered. Specifically, to alter the orientation to the orientation shown in FIG. 2, the user lifts a portion of first end 32 of clip member 28 until aperture 36 is removed from engagement with first shank member 42. Next, the clip member is slid backward until first end 32 of clip member 28 exits channel member 40. Next, the user similarly removes clip member 28' from channel member 40'.

Once both clip members are fully separated from the channel members, the user repositions clip member 28 into second channel 46 (FIG. 6). As clip member 28 passes to second shank member 48, cammed surface 66 forces clip member 28 over second shank member 48, until first aperture 36 engages second shank member 48. Depending on the size and shape of the outside surface, the user may further adjust the linear position of the clip member 28 relative to first channel member 40. Specifically, the user may exert a lifting force on first end 32, to, in turn, disengage first aperture 36 from second shank member 48 and then slide the clip member until the second aperture 38 engages second shank member 48. As such, the aperture/shank engage and maintain the proper desired position of the clip member relative to the channel member. In an identical manner, clip member 28' can be repositioned into bottom second channel member 46'. Once both of the clip members have been reoriented, the user can attach the article to the outside surface by pushing the outer surface between the curved region of the second end and the second end itself inasmuch as the curved region is biased thereagainst.

In certain instances, for added security or otherwise, the user may position elastic bands, string or other loop structures (not shown) through tunnel regions 20, 20'. These elastic bands may then be positioned around the surface (for example, around the sunvisor). These bands may be used together with, or in lieu of, the clip members, as supplementary, or alternative, attachment structures, respectively.

The foregoing description and drawings merely explain and illustrate the invention and the invention is not limited thereto except insofar as the appended claims are so limited, as those skilled in the art who have the disclosure before them will be able to make modifications and variations therein without departing from the scope of the invention.

We claim:

1. An article for attachment to a surface comprising:

a base member having a top surface, a bottom surface and a transverse axis;

means, disposed along the bottom surface, for attaching the base member to the surface wherein the attachment means includes, at least one releasable clip member operably configured to releasably grip and at least partially encircle a surface, and at least one first means for selectively retaining the at least one clip member in releasable securement with the base member, at least one second means for selectively retaining the at least one clip member in releasable securement with the base member, the at least one first means for retaining the clip member and the at least one second means for retaining the at least one clip member being disposed in angularly displaced relationship to one another, relative to the base member, the at least one clip member being selectively positionable between the at least one first means for selectively retaining the at least one clip member to the at least one second means for selectively retaining the at least one clip member, enabling the selective securement of the base member to a surface from one of at least two orientations which are angularly displaced from one another, relative to the base member, the at least one clip member further including a first end and a second and;

the first end of the at least one clip member including at least one opening defining a first aperature;

the at least one first means for retaining the at least one clip member in releasable securement with the base member including, at least one first channel member associated with the base member capable of slidably receiving the at least one clip member;

the at least one first channel member including first shank member positioned such that upon slidable positioning of the at least one clip member into the at least one first channel member, the first shank member engages the aperture of the first end of the at least one clip member; and the article further including a limiter member, apart from the first shank member, disposed in the at least one first channel member and emanating from the base member, for limiting, by abutting contact, slidable movement of the at least one clip member along the base member, in a direction toward an interior region of the bottom surface of the base member.

2. The article according to claim 1 wherein the at least one second means for selectively retaining the at least one clip member in releasable securement with the base member includes:

at least one second channel member associated with the base member capable of slidably receiving the at least one clip member, the at least one second channel member being positioned in a substantially perpendicular position relative to the at least one first channel member; and the at least one second channel member including a second shank member positioned such that upon slidable positioning of the at least one clip member into the at least one second channel member, the second shank member engages the aperture of the first end of the at least one clip member.

3. The article according to claim 2 wherein:

the at least one second channel member comprises two second channel members positioned substantially parallel to each other.

4. The article according to claim 2 wherein:

the base member includes an exterior perimeter;

the at least one first channel member includes a first pair of spaced apart guide members, one of which is proximal the exterior perimeter and the other of which is distal the exterior perimeter;

the first shank member is positioned more distal from the exterior perimeter than the distal guide member of the first channel member;

the at least one second channel member includes several pair of spaced apart guide members, one of which is proximal the exterior perimeter and the other of which is distal the exterior perimeter; and the second shank member is positioned more distal from the exterior perimeter than the distal guide member of the second channel member.

5. The article according to claim 1 wherein the first shank member includes a cammed surface to facilitate engagement of first shank member and the first aperture.

6. The article according to claim 1 wherein the first end of the at least one clip member includes two openings defining a first aperture and a second aperture.

7. The article according to claim 1 wherein the base member is substantially rectangular with a first pair of sides being longer than a second pair of sides;

the first channel member is oriented parallel to the second pair of sides; and the second channel member is oriented parallel to the first pair of sides.

8. The article according to claim 1 wherein:

the at least one clip member comprises two clip members;

the at least one first channel member comprises two first channel members positioned substantially parallel to each other.

9. The article according to claim 1 further including at least one elongated tunnel region associated with the base member generally parallel to the transverse axis.

10. The article according to claim 1 further including a frame member extending around at least a portion of a exterior perimeter of the base member.

11. The article according to claim 1 further including a reflective member positioned on at least a portion of the top surface of the base member.

12. The article according to claim 11 further including a frame member extending around at least a portion of an outer perimeter of the reflective surface.

13. The article according to claim 12 wherein the frame member extends over at least a portion of a top surface of the reflective surface.

14. The article according to claim 13 wherein the frame member is attached to the base member so as to fixedly clamp at least a portion of the reflective surface therebetween.

15. The article according to claim 1 wherein the second end of the at least one clip member includes a curved tip region bent back about the second end and being capable of slidable securement of the surface.

16. The article according to claim 15 wherein the curved tip region is biased against a portion of the second end of the at least one clip member.

17. The article according to claim 1 wherein the means for retaining the at least one clip member includes a pair of spaced apart guide members.

18. The article according to claim 1 wherein:

the base member has an exterior periphery;

the at least one first channel member includes a first pair of spaced apart guide members, one of which is proximal the exterior perimeter and the other of which is distal the exterior perimeter; and the first shank member of the first channel member is positioned more distal frog the exterior perimeter than the distal guide member of the first channel member.

* * * * *

UNITED STATES PATENT AND TRADEMARK OFFICE
CERTIFICATE OF CORRECTION

PATENT NO. : 5,938,165
DATED : August 17, 1999
INVENTOR(S) : Jerome Hartmann and Thomas R. Steinhagen It is certified that error appears in the above-identified patent and that said Letters Patent is hereby corrected as shown below:

Column 1, Line 38   Change "bemuse" to --because--

Column 1, Line 44   Change "sped" to --shaped--

Column 2, Line 20   After "second" insert --end--

Column 3, Line 63   Change "so" to --shown--

Column 5, Line 16   Change "win" to --will--

Column 8, Line 36   Change "frog" to --from--

Signed and Sealed this

First Day of May, 2001

Attest:

NICHOLAS P. GODICI

Attesting Officer          Acting Director of the United States Patent and Trademark Office